(12) United States Patent
Bierschneider

(10) Patent No.: US 8,806,840 B2
(45) Date of Patent: Aug. 19, 2014

(54) CONTAINER-HANDLING PLANT WITH RETROACTIVE CORRECTION CAPABILITY AND METHOD FOR RETROACTIVELY CORRECTING FAULTS OCCURRING WITHIN A CONTAINER-HANDLING PLANT

(75) Inventor: Stefan Bierschneider, Sarching (DE)

(73) Assignee: Krones AG, Neutraubling (DE)

( * ) Notice: Subject to any disclaimer, the term of this patent is extended or adjusted under 35 U.S.C. 154(b) by 466 days.

(21) Appl. No.: 12/851,933

(22) Filed: Aug. 6, 2010

(65) Prior Publication Data
US 2011/0033269 A1    Feb. 10, 2011

(30) Foreign Application Priority Data

Aug. 10, 2009 (DE) .................. 10 2009 037 172

(51) Int. Cl.
| | | |
|---|---|---|
| *B67C 3/00* | (2006.01) | |
| *B65B 57/02* | (2006.01) | |
| *B67C 3/22* | (2006.01) | |
| *B29C 49/06* | (2006.01) | |
| *B29C 49/36* | (2006.01) | |
| *B29C 49/42* | (2006.01) | |
| *B29C 49/64* | (2006.01) | |

(52) U.S. Cl.
CPC ............... *B67C 3/007* (2013.01); *B65B 57/02* (2013.01); *B67C 2003/227* (2013.01); *B29C 49/06* (2013.01); *B29C 49/36* (2013.01); *B29C 49/4205* (2013.01); *B29C 49/6409* (2013.01)
USPC ..................................... 53/55; 53/77; 53/167

(58) Field of Classification Search
CPC .................... B65B 57/02–57/08; B67C 3/007
USPC ............ 53/52, 55, 56, 58, 77, 167, 272, 499, 53/561, 251, 282
See application file for complete search history.

(56) References Cited

U.S. PATENT DOCUMENTS

| | | | | |
|---|---|---|---|---|
| 2,606,657 | A * | 8/1952 | Berthelsen .................... 209/532 |
| 3,073,444 | A * | 1/1963 | Bielinski et al. .............. 209/524 |
| 3,368,593 | A * | 2/1968 | Mamas ............................ 141/83 |
| 3,828,668 | A * | 8/1974 | Zugcic ............................ 101/40 |
| 4,408,295 | A * | 10/1983 | Kavage et al. ............. 250/559.4 |
| 4,691,496 | A  | 9/1987 | Anderson et al. |
| 5,538,054 | A * | 7/1996 | Luhmann et al. ............. 141/198 |

(Continued)

FOREIGN PATENT DOCUMENTS

| | | |
|---|---|---|
| CN | 1191797 A | 9/1998 |
| CN | 101077615 | 11/2007 |

(Continued)

OTHER PUBLICATIONS

Office Action issued in corresponding Chinese Patent Application No. 9810 3843.3.

(Continued)

*Primary Examiner* — Stephen F Gerrity
(74) *Attorney, Agent, or Firm* — Onello & Mello, LLP

(57) ABSTRACT

A device and a method for the handling of containers with a plurality of handling units. A defective state in a handling element situated downstream can be recognized and as a reaction to this recognition a specified container conveyed upstream can be separated out, namely preferably that container which in the further operating sequence would arrive at the handling element known to be operating defectively.

19 Claims, 3 Drawing Sheets

(56) References Cited

U.S. PATENT DOCUMENTS

| | | | |
|---|---|---|---|
| 6,080,353 A | 6/2000 | Tsuchiya | |
| 6,536,598 B2* | 3/2003 | Furnas | 209/523 |
| 6,584,805 B1* | 7/2003 | Burns et al. | 65/29.12 |
| 6,695,484 B2 | 2/2004 | Vignotto et al. | |
| 7,399,435 B2* | 7/2008 | Dunzinger et al. | 264/40.1 |
| 7,571,585 B2 | 8/2009 | Till | |
| 8,231,823 B2 | 7/2012 | Humele et al. | |
| 8,265,781 B2 | 9/2012 | Ramsauer et al. | |
| 2003/0031391 A1 | 2/2003 | Vignatto et al. | |
| 2004/0159586 A1* | 8/2004 | Dunzinger et al. | 209/11 |
| 2007/0017593 A1* | 1/2007 | Bernhard | 141/2 |
| 2007/0220835 A1* | 9/2007 | Till | 53/471 |
| 2009/0071104 A1* | 3/2009 | Fischer | 53/426 |
| 2009/0077933 A1* | 3/2009 | Backhaus et al. | 53/561 |
| 2010/0011712 A1 | 1/2010 | Till | |
| 2010/0016997 A1 | 1/2010 | Ramsauer et al. | |
| 2010/0052224 A1 | 3/2010 | Humele et al. | |
| 2010/0324723 A1* | 12/2010 | Zech | 700/223 |

FOREIGN PATENT DOCUMENTS

| | | |
|---|---|---|
| DE | 4332095 | 4/1994 |
| DE | 4332645 | 3/1995 |
| DE | 10229589 | 3/2003 |
| DE | 10259589 | 4/2004 |
| DE | 102005060814 | 7/2007 |
| WO | 0078664 | 12/2000 |
| WO | 2006097243 | 9/2006 |
| WO | 2007131701 A2 | 11/2007 |
| WO | 2008049518 | 5/2008 |

OTHER PUBLICATIONS

Office Action issued on Nov. 26, 2013 in corresponding Chinese Patent Application No. 2010102606357 and English translation.

* cited by examiner

CONTAINER-HANDLING PLANT WITH RETROACTIVE CORRECTION CAPABILITY AND METHOD FOR RETROACTIVELY CORRECTING FAULTS OCCURRING WITHIN A CONTAINER-HANDLING PLANT

RELATED APPLICATIONS

This application claims the benefit of German Patent Application No. 10 2009 037 172.9, filed on Aug. 10, 2009, in the German Patent and Trademark Office, the contents of which is incorporated herein by reference in its entirety.

TECHNICAL FIELD

The present inventive concepts generally relate to devices, systems and methods for the handling of containers.

BACKGROUND

Conventional container handling devices are known from the prior art. It is thus known that in the context of block plants, i.e., plants of which the drive units are synchronized with one another, pre-forms are first heated and are then expanded to form containers. After expansion of the pre-forms, these expanded containers are cleaned and are then filled with a liquid, such as, a drink or beverage.

WO 2000/078664, the content of which is incorporated herein by reference in its entirety, describes a filling device for bottles. In this case a blow-moulding machine for producing the bottles, a rinsing machine for cleaning the finished blow-moulded bottles and a filling machine for filling the bottles are capable of being driven in synchronism with one another, and the bottles are transferred between the machines with proper spacing by conveying elements engaging with positive locking.

WO 2006/097243 and US 2009/0071104, the contents of which are incorporated herein by reference in their entirety, discloses a method and a device relating to the sterile filling of liquids. In one example, bottles are first sterilized with $H_2O_2$ and are then filled.

DE 10 2005 060 814, the content of which is incorporated herein by reference in its entirety, discloses a device and a method of blow-moulding containers. In one example, an inspection device for communicating information is connected to a blow-moulding device arranged downstream in the conveying direction of the containers, so that pre-forms recognized as being defective are not blow-moulded to form containers. In this way, containers specified here are recognized as being defective and at a later point in time the further handling of these containers is interrupted.

DE 102 59 589 and US 2004/159586, the contents of which are incorporated herein by reference in their entirety, describes a method and a device for producing hollow bodies from plastic materials. In this case pre-forms are monitored before heating and at least some of the defective pre-forms are heated and are discarded only after the heating.

In such block unit components, i.e., in particular unit components synchronized with one another, the problem frequently arises, however, that an error is present in a unit component situated downstream, for example a valve is defective in a filling machine, and therefore a corresponding container cannot be correctly filled. In the case of plants from the prior art this leads to considerable wastage. Firstly the container in question is produced unnecessarily and sterilized unnecessarily. In addition, the contents to be bottled also frequently goes to waste, since, as mentioned, they were bottled erroneously.

SUMMARY

An object of the present invention is therefore to provide a device which permits a more economical and efficient operation. This is attained according to advantageous arrangements described herein.

A device according to the invention for the handling of containers has a first handling unit which handles the containers in a first pre-set manner. Furthermore, a second handling unit is provided which is arranged downstream with respect to the first handling unit in the conveying direction of the containers, the second handling unit having a plurality of handling elements for handling the containers. According to the invention the second handling unit has at least one state-recognition device, which recognizes an atypical state of at least one handling element and one container handled by this handling element, and at least one control device which assigns to this handling element at least one container to be handled by this handling element or at least one container handled by this handling element.

Furthermore, the device has a barring device which interrupts the supply of containers to at least one handling unit. This barring device preferably interrupts the supply of all the containers which arrive in the device. After this interruption the plant can be stopped, in particular in order to carry out necessary repairs on a possibly defective unit.

This barring device is preferably arranged upstream with respect to the first handling unit. For example it can be a pre-form barrier at the inlet to the blow-moulding furnace. The barring device is thus preferably controllable. In addition, the control device preferably also controls the barring device, in particular in a manner dependent of a state recognized by the state-recognition device.

The terms "upstream" and "downstream" are to be understood with respect to the conveying or transporting direction of the containers, such as for example the bottles, through the device. Handling the bottles is to be understood as being any procedure which affects the containers in any way, in particular heating the containers, expanding pre-forms to form containers, labelling containers, disinfecting containers, rinsing containers, bottling containers, closing containers and conveying the containers both in a separated form and in a non-separated form.

In particular, the container to be handled upstream should be understood as being a container which is situated upstream with respect to the specified handling element and which will be handled by the specified handling element. In this way those containers are identified which would arrive at this element. It would also be possible, however, for those containers to be identified which have already been handled by the specified handling element.

A state-recognition device is understood to be a device which recognizes a physical state of the handling unit or the handling element or the container, such as for example the operational capability of a valve, the operational capability or the opening state of a gripper element and the like.

An atypical state is to be understood as being a state which deviates from a normal operating state. In particular, the atypical state involves a defect of the handling element such as for example a non-functioning valve, a non-functioning gripper device or the like. It would also be possible, however, to recognize an atypical state of the container. In this way it is possible in part for individual containers to be formed defectively, but for this defective construction to be attributed to a defective handling procedure, such as for example a defective blow-moulding procedure. It would also be possible, however, for the device not to have a state-recognition device, but for the user himself to recognize a defective state and to initiate—in reaction to this—the procedures named above, and, in particular, also the barring of the pre-form supply.

It is thus proposed within the scope of the present invention to detect a fault occurring subsequently in the context of the handling process and after that to determine to which containers present earlier in the handling procedure this fault should be attributed. In this way, it is possible for example for a specific valve of the filling plant to be faulty. According to the scope of the present invention it is determined which containers still situated upstream will be filled with just this valve in the further course of the process. These containers can then be handled in a special way, for example they can be diverted beforehand. In this way it is possible to avoid the occurrence of wastage, such as for example unnecessarily sterilized containers and/or unnecessarily filling containers. In this way, for example an intentional gap can be made in the case of the non-operative valve.

In other words, if the operation of a module has been impaired so that proper handling of the container is not possible in this module, then for example a pre-form which would subsequently enter the faulty module or the faulty station is barred. In this way, there is now less loss of material, a charge can be produced complete and the fault can subsequently be rectified. A corresponding offset must thus be calculated in such a way that a gap occurs precisely at the faulty station. In the prior art an overfilled bottle for example was discarded downstream of the device by way of a monitoring system, and this resulted in an increased loss of material (pre-form, product, and possibly the closure and label).

In addition, it is also possible to identify those containers which have already been handled by the (faulty) handling element in order to separate them out subsequently. In this way, for example, the handling element could be a non-functioning labelling unit which is not labelling the containers or is not labelling them correctly. Those containers which have passed through this labelling unit could be separated out so as to prevent them from being further handled.

In a further advantageous embodiment the device has a separating device which separates out the container to be handled by the handling element. In this way that container which would subsequently encounter the faulty handling element is sorted out beforehand. Containers are to be understood in this case as being both the finished blow-moulded containers and any preliminary stages such as pre-forms. For example it would be possible to provide a pre-form barrier which will separate out specific pre-forms. In this case it should be pointed out that the pre-forms are supplied for example by way of a stowing path and the actual clock-timing starts only at the end of this stowing path. A separating mechanism can be provided in this area.

In a further advantageous embodiment the device has a separating device which separates out containers handled by the handling element. A separating unit of this type is arranged in particular downstream of the second handling unit. It is preferable for this separating unit to be arranged immediately downstream of the second handling unit, i.e. before further handling units are attached.

This separating unit may be for example an ejecting means which is preferably arranged on a transfer star which transfers the containers from the first handling unit to the second or a further handling unit. This ejecting means is advantageously controllable (in particular in a manner dependent upon a signal of the control device).

In a further advantageous embodiment at least one handling unit is a labelling device for the containers. This labelling device advantageously has a plurality of handling elements or labelling units.

In a further preferred embodiment the control device causes every n-th container to be separated out, n being the number of the second handling units. If for example filling valve No. 56 (of 120 altogether) is faulty and is supplying overfilled bottles, in this way every 120th pre-form is not let into the block. Other possibilities of separation out, however, would also be possible, such as for example the containers first being blow-moulded and then being separated out. In the present case for example every 120th bottle will be separated out. With an operating capacity of for example 36,000 bottles per hour, in this way altogether 300 bottles per hour would be separated out, i.e. these bottles need not be filled unnecessarily. A considerable reduction in loss of material can be achieved in this way.

In a further advantageous embodiment the separating device is arranged upstream with respect to the second handling unit, i.e. in the direction of movement of the containers in front of the second handling unit. In this way, as mentioned above, a reduction in losses can be achieved.

In a further advantageous embodiment the second handling unit is a filling device for the containers. It would also be possible, however, for the second handling unit to be a sterilization device, a blow-moulding device, a washing device for containers or the like.

In a further advantageous embodiment the first handling unit is a conveying device for the pre-forms, a conveying device also being understood in this case as being a stowing path along which the containers or the pre-forms are conveyed (possibly also not separately). Furthermore, the first handling unit could also, however, be a heating device for pre-forms, a blow-moulding device for the pre-forms, a cleaning device or a disinfecting device for the containers and the like.

In a further advantageous embodiment the device has a buffering unit for separated containers. As mentioned above, it would be possible to separate out already specified pre-forms. This would have the result, however, that on account of the precisely dimensioned heating parameters the pre-form situated in front of the separated pre-form and the pre-form situated after the separated pre-form would also have to be separated (after the heating procedure). For this reason it is proposed in a preferred arrangement for all the containers first to be blow-moulded and then, however, for the precisely identified container to be separated out and to be held in a buffering unit. The containers could be removed again later from this buffering unit, so that a further reduction in losses can be achieved in this way. In a further advantageous embodiment the first handling unit has a plurality of handling elements. These can be gripping elements for example, which convey the containers along a pre-set path. In this case for example a specified handling element can be identified which then separates out the container held by it.

The present invention further relates to a method of handling containers, in which the containers are handled in a first pre-set manner in a first handling unit and are then handled in a second planned manner in a second handling unit with a plurality of handling elements. According to the invention an atypical state of at least one handling element or a container handled by this handling element is recognized and this handling element has assigned to it at least one container to be handled by this handling element or at least one container handled by this handling element and the supply of the containers is interrupted at least temporarily.

It is preferable for a group of containers to be assigned to this handling element. As a result of interrupting the supply of the containers, the device can be intentionally run empty, the quantity of rejects being kept as low as possible at the same time.

In this way, an engagement, which occurs upstream and which in the further operating sequence of the machine can have the effect that the faulty handling element will produce no further unnecessary losses, is also proposed in the case of the method according to the invention. It is advantageous if the container to be handled in the future by the first handling element is separated out.

It would also be possible, however, for a container already handled by the first handling element to be separated out. This is relevant particularly when further operative steps of this type, which are to be carried out downstream with respect to this handling element, should be avoided at this container.

In a further advantageous method a supply of the containers, in particular in their entirety, is interrupted. In a further preferred method the device is stopped after the interruption of the supply of the containers—in particular after the handling of the containers still present in the machine after the barring—for a pre-set period of time.

It is preferable if all those containers are separated out which would be handled in the future by the handling element (in question recognized operating atypically). In this case, in particular when a fault is recognized, all the containers are separated out which would arrive at this special handling element in the future.

It is preferable if the containers to be separated out are separated out after a heating procedure for the containers. In a further advantageous embodiment the containers to be separated out are separated out after the blow-moulding process, and, in a particularly preferred manner, are arranged in a buffering device.

In one aspect, a device for the handling of containers, comprises: a first handling unit that handles containers in a first pre-set manner; a second handling unit that handles containers in a second pres-set manner, the second handling unit being arranged downstream with respect to the first handling unit in a conveying direction of the containers, wherein the second handling unit comprises: a plurality of handling elements for handling the containers; and at least one state-recognition device, which recognizes an atypical state of at least one handling element or at least one container handled by at least one of the plurality of handling elements; at least one control device that assigns to at least one of the plurality of handling elements at least one container to be handled by the at least one of the plurality of handling elements; and a barring device that interrupts the supply of containers to at least one of the first and second handling units.

In one embodiment, the device further comprises a separating device that separates out containers to be handled by the plurality of handling elements.

In another embodiment, the device further comprises a separating device that separates out containers handled by the plurality of handling elements.

In another embodiment, one of the first and second handling units is a labelling device for the containers.

In another embodiment the control device is configured to cause every n-th container to be separated out, wherein n is the number of handling elements of the second handling unit.

In another embodiment, the first handling unit and the second handling unit are synchronized with each other.

In another embodiment, the second handling unit is a filling device for the containers.

In another embodiment, the first handling unit is a heating device for pre-forms or a blow-moulding device for containers.

In another embodiment, the device further comprises a buffering unit for separated containers.

In another embodiment, the plurality of handling elements of second handling unit comprises a plurality of second handling elements, and wherein the first handling unit comprises a plurality of first handling elements for handling the containers.

In another aspect, a method of handling containers, comprises: handling a plurality of containers in a first pre-set manner in a first handling unit; conveying the plurality of containers downstream from the first handling unit, the plurality of containers being conveyed in a first conveying direction; handling the plurality of containers in a second pre-set manner in a second handling unit with a plurality of handling elements, the second handling unit being arranged downstream with respect to the first handling unit; recognizing an atypical state of at least one of the plurality of handling elements of the second handling unit or at least one of the plurality of containers handled by the second handling unit; and temporarily interrupting a supply of the plurality of containers assigned to the at least one of the plurality of handling elements of the second handling unit recognized as being in an atypical state or temporarily interrupting a supply of the plurality of containers recognized as being in an atypical state.

In one embodiment, the supply of the plurality of containers recognized as being in the atypical state to be handled by the handling elements of the second handling unit is separated out.

In another embodiment, the supply of the plurality of containers assigned to the at least one of the plurality of handling elements of the second handling unit is separated out.

In another embodiment, the containers to be separated out are separated out after a heating procedure for the containers.

In another embodiment, the containers to be separated out are arranged in a buffering device.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

DETAILED DESCRIPTION OF EMBODIMENTS

Figure 1:
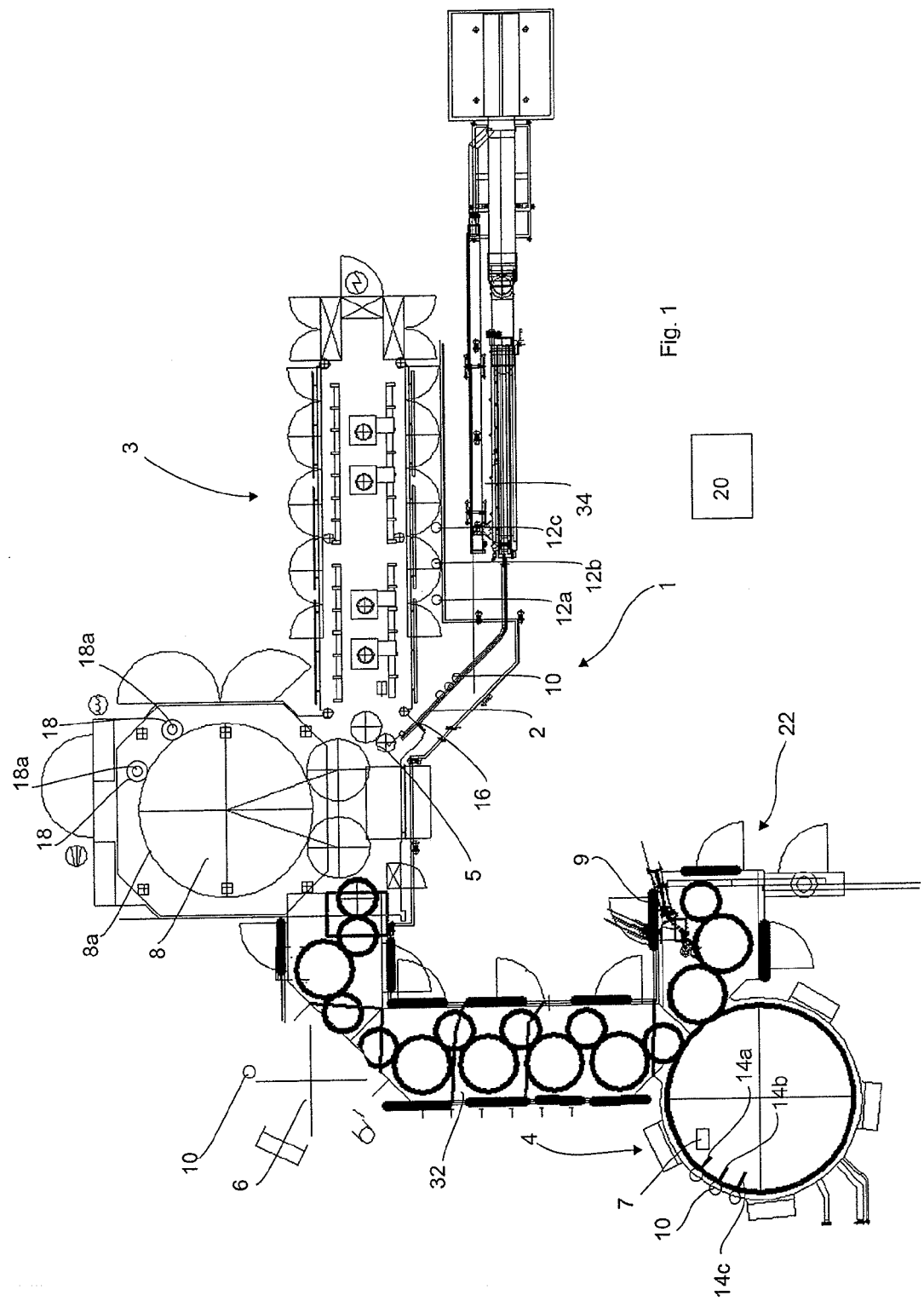
FIG. 1 is a perspective view of a device for the handling of containers, in accordance with a first embodiment of the present inventive concepts.

FIG. 1 shows a device 1 according to the invention for the handling of containers/pre-forms 10. In this case the reference number 2 designates a first handling unit in the form of a conveying device 2. This conveying device 2 is designed in this case in the form of a chute, along which containers/pre-forms 10 or chains of containers/pre-forms 10 are conveyed. In this region the containers/pre-forms 10 are not yet separated. A magazine or even a sorting mechanism 34 for the containers/pre-forms 10, which places the containers/pre-forms 10 in a specified starting position, could be provided upstream with respect to this first handling unit.

The reference number 5 designates a clock-timed wheel which transfers the containers/pre-forms 10 to a conveying device (not shown), this conveying device conveying the containers 10 or pre-forms 10 through a heating device 3. After this clock-timed wheel 5 the containers/pre-forms 10 are conveyed separately. A separation device 16, which can separate out individual containers/pre-forms 10, is provided directly on or at this clock-timed wheel 5. In this way, gaps can be intentionally formed on the conveying path of the containers/pre-forms 10. Then, as mentioned above, the containers/pre-forms 10 are conveyed through the heating device 3 and are heated therein. In this case the heating device 3 includes holding elements for the containers, for example in the form of mandrels, on which the containers are placed. These holding elements are designated by the reference signs 12a, 12b and 12c.

After that, the containers/pre-forms 10 are transferred to a blow-moulding device 8. The blow-moulding device can comprise a blow-moulding wheel 8a with a plurality of blow-moulding stations 18 arranged thereon. Each station 18 of the blow-moulding wheel can comprise one or more holding elements 18a.

After the containers/pre-forms 10 have been expanded to form expanded containers 10 in this blow-moulding station, they are transferred to a rinsing unit 6. In this rinsing unit 6 (also referred to as a rinser) the containers 10 already produced are rinsed with clear water. This rinsing unit is adjoined by a plurality of conveying stars or conveying wheels 32, an internal or external disinfecting of the containers for example with $H_2O_2$ or the like also taking place in this region.

The reference number 4 designates a filling device which has a plurality of handling elements 14a, 14b, 14c for filling the containers 10. This filling device 4 is adjoined by a closing device 9 which closes the containers 10 which have already been filled.

The reference number 7 designates a state-recognition device (shown only diagrammatically), which detects states of the handling elements, such as in particular but not exclusively defective states. In addition, it would be possible for each handling element 14a, 14b, 14c to have associated with it a state-recognition device of this type or even for each handling element 14a, 14b, 14c to have associated with it a plurality of state-recognition devices 7 which detect different states of the handling element.

The state-recognition device 7 can be for example a through-flow sensor which detects whether a specified filling valve is filling the correct quantity of liquid into the container 10 at the correct time. The state-recognition device 7 could also be a sensor which detects specified parameters of the container handled, such as for example a sensor which determines the overfilling of the container with the drink. State-recognition devices of this type could also be provided on other handling units such as for example a disinfecting unit.

After that, a labelling device (not shown) for the containers already filled could be provided.

In this way, the containers/pre-forms 10, as mentioned above, are separately conveyed starting from the clock-timed star 5 and are thus identifiable by a processor device 20. If for example a malfunction is determined at the handling element 14a, it is possible to detect with the aid of the processor device 20 the containers 10 that will arrive at this faulty handling element 14a or filling element 14a in the future. The corresponding containers 10 assigned to the faulty handling element 14a can be separated out by way of the separating device 16, and in this manner a gap is created in the supply of containers 10, which later meets the faulty filling element 14a or handling element 14a. Accordingly, a gap in the supply of containers 10 can be produced in an intentional manner upstream with respect to the faulty filling element 14a, which in one embodiment, can be a handling element 14a of the filling device 4. Gaps are thus intentionally produced in a continuous sequence of containers 10 or supply of containers 10, these gaps being intentionally produced upstream with respect to a handling element detected as being faulty. The separating device 16 can be a flap mechanism which is able to separate out individual containers 10 from a flow of containers 10. In other embodiments, the containers/preforms 10 can be separately conveyed such that a malfunction in any one of the handling devices or elements of the filling device 4, a rinsing device, for example, rinsing device 6, and/or the blow-moulding unit 8 can be accounted for. That is, gaps can be intentionally produced upstream with respect to a handling element detected as being faulty in anyone of the handling devices or elements of the filling device 4, rinsing device 6, container 10 handled by a handling element, and/or blow-moulding unit 8.

Figure 2:
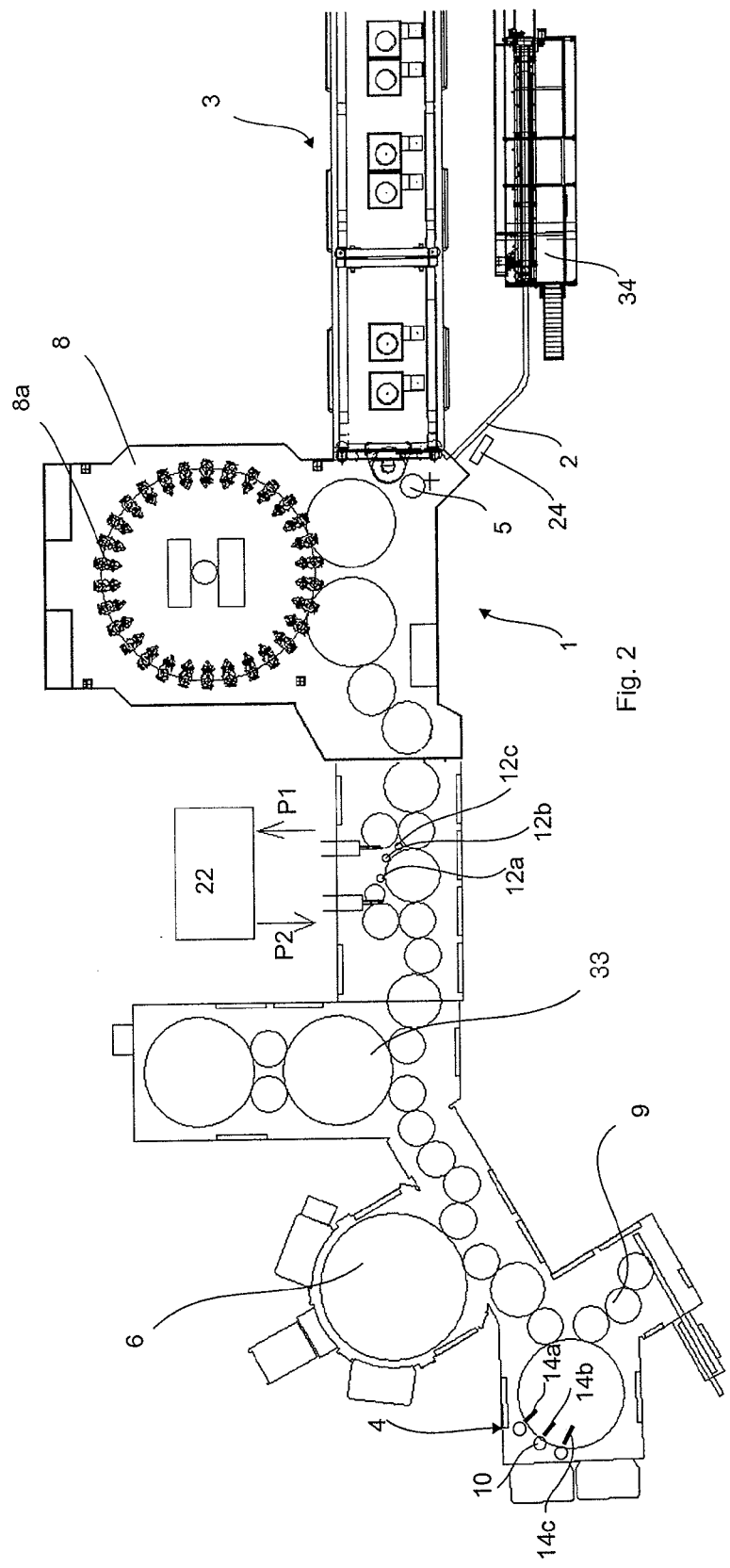
FIG. 2 is a perspective view of a device for the handling of containers, in accordance with a second embodiment of the present inventive concepts.

FIG. 2 shows a further embodiment of a device according to the invention. This likewise has the main elements shown in FIG. 1, such as a heating device 3, a blow-moulding device 8, a disinfecting device 33, a clear-water rinsing device 6 and a filling device 4, downstream of which a closing device 9 is arranged. In contrast to the embodiment shown in FIG. 1, in this embodiment the containers 10 are not separated out upstream or in front of the heating device 3, but the containers 10 are first conveyed through the heating device 3, are then blow-moulded in the blow-moulding device 8 and in the event that a fault is detected in a handling element 14a are diverted only downstream or after the blow-moulding device 8 along the arrow P1 into a buffer path.

In this way, in this embodiment, finished containers are first produced, although they are not disinfected, but removed in a finished blow-moulded state. In this embodiment specified handling elements 12a, 12b or 12c, which release the containers held by them, are activated in a purposeful manner. In this embodiment the handling elements 14a, 14b, 14c thus have associated with them, in particular in the event of a fault, specified handling elements 12a, 12b, 12c which guide those containers which would arrive at a faulty handling element 14a in the subsequent operation of the plant.

In the embodiment shown in FIGS. 1 and 2 the second handling unit is the filling device 4. It would also be possible, however, for the second handling unit 4 to be a different unit, such as for example the blow-moulding device 8 or rinsing device 6.

The containers separated along the arrow P1 can later be conveyed back into the plant again (along path P2) after the fault has been rectified, in which case these containers 10 are then first disinfected, rinsed with clear water and finally filled with a drink and closed. The reference numeral 22 designates a corresponding buffering unit in which the containers 10 are temporarily stored. The reference sign 24 designates a preform barrier which completely interrupts the supply of the pre-forms into the heating device 3. After the supply has been interrupted, the device can intentionally be run empty.

Figure 3A:
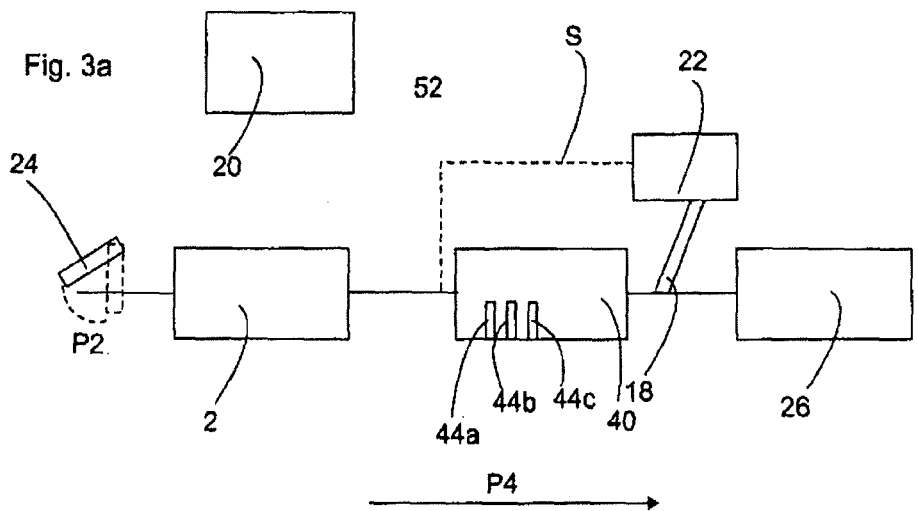
FIG. 3a is a block diagram of a device for the handling of containers, in accordance with a third embodiment of the present inventive concepts.

FIG. 3a is a rough diagrammatic view of a further arrangement of the present invention. In this case a first handling unit 2 is a blow-moulding machine with a heating device which is arranged in front and which first heats the pre-forms and then expands them to form plastics containers 10. This blow-moulding machine is followed by a second handling unit in the form of a labelling device 40 which in this case has two labelling units 44a and 44b. The labelling device 40 can optionally include a third labelling unit 44c. The reference numeral 26 designates a further handling unit which in this case can be a filling means for example. The arrow P4 indicates the conveying direction of the containers.

The following description starts from the fact that a labelling unit 44a is faulty. As a result of this fault an entry barrier 24 or barring device is closed, so that no further pre-forms arrive in the heating device and blow-moulding machine 2. The plastics pre-forms present in the heating device are blow-moulded in the blow-moulding machine and are passed on to the second handling unit, i.e. the labelling device. The containers moving past the still functioning unit 44b are labelled by the latter. The containers moving past the faulty unit 44a are not labelled but are separated and collected in a controlled manner downstream of the exit of the labelling machine 40.

In this case too, this means that those containers which are treated by the labelling unit 44a are identified. In addition, it would be possible to identify (subsequently) those containers which have passed through this faulty labelling unit 44a and have therefore not been properly labelled. The reference numeral 18 designates a corresponding barring device or diverting device which separates out in a purposeful manner those containers that have not been properly labelled and conveys them to a buffering device 22. The labelled containers are conveyed to the following system, in this case a filling means 26, for further processing.

This process which was started after the fault lasts until the final containers have been conveyed from the blow-moulding machine 2 through the labelling machine 40. After that the entire block comprising the machines 2, 40 and 26 is stopped, so that the fault at the unit 44a can then be rectified. Production can then start again with the two units 44a and 44b. The separated, non-labelled containers can optionally (reference letter S) be diverted back into the system, but a (complete) rejection of these containers is also possible.

Figure 3B:
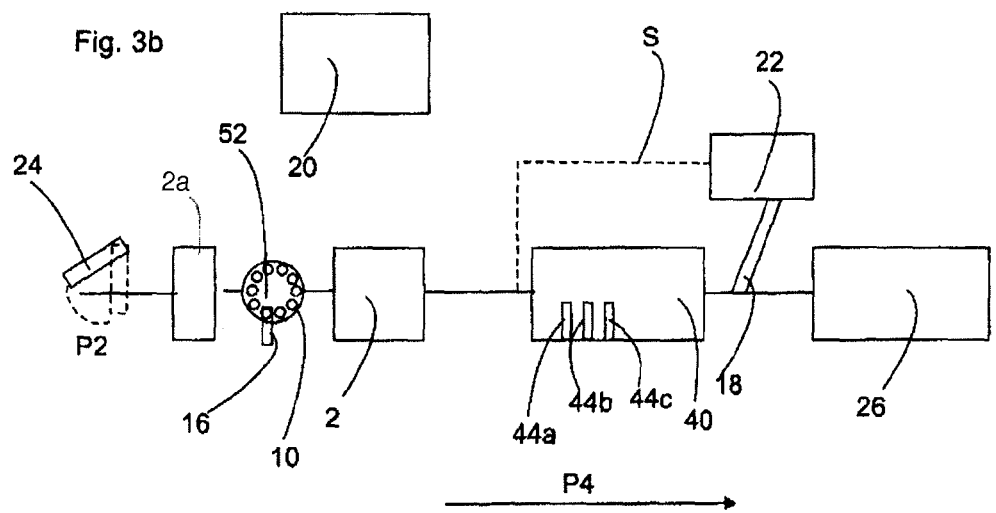
FIG. 3b is a block diagram of a device for the handling of containers, in accordance with a fourth embodiment of the present inventive concepts.

In a second alternative shown in FIG. 3b a transfer star 52 with an ejection means capable of being actuated is additionally provided between a heating device 2a and a blow-moulding machine 2. This ejection means receives from a control device the information as to which pre-forms or containers are diverted out at this point or which pre-forms can be transferred to the blow-moulding module 2, so as subsequently to label the container at the still functioning unit 44a. In this way, in this variant the plastic pre-forms are already diverted out before the actual expansion procedure. In this case it would be possible both to carry out the exclusion of the pre-forms in front of the heating device and, in a preferred manner, to separate out the individual, already heated pre-forms downstream of the heating device. In the case of the latter variant, containers are no longer conveyed past the faulty labelling unit 44a. Separating out the pre-forms only after they have been heated is advantageous since the heating process is also set to the pre-forms in their entirety and removing individual pre-forms can also affect the heating of the remaining pre-forms.

In this way, all the plastic pre-forms, which in theory should be labelled at the faulty labelling unit 44a, are separated out and rejected at this transfer star 52.

The containers already in transit from the blow-moulding module to the labelling machine are, as described above, labelled by the unit 44a still in service. The containers which are not to be labelled can be diverted out in a controlled manner downstream of the labelling machine 40 and can possibly be supplied for re-use. In the case of this method, too, the process initiated after the damage lasts until the final containers have been conveyed from the blow-moulding machine through the labelling machine, and after that the entire block is stopped in this case as well. The barring device is preferably arranged upstream with respect to the first handling unit, and in particular upstream with respect to the heating device.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A device for the handling of containers, comprising:
a first handling unit that handles containers in a first pre-set manner;
a second handling unit that handles containers in a second pre-set manner, the second handling unit being arranged downstream with respect to the first handling unit in a conveying direction of the containers, wherein the second handling unit comprises:
a plurality of handling elements for handling the containers; and
at least one state-recognition device, which recognizes an atypical state of at least one handling element or at least one container handled by at least one of the plurality of handling elements;
at least one control device that assigns to at least one of the plurality of handling elements at least one container to be handled by the at least one of the plurality of handling elements;
a barring device that interrupts the supply of containers to at least one of the first and second handling units; and
a separating device that only separates containers to be handled by the at least one handling element having the atypical state to produce a gap, which later meets the at least one handling element having the atypical state, in an intentional manner upstream with respect to the second handling unit.

2. The device according to claim 1, wherein the device further comprises a further separating device that separates out containers handled by the plurality of handling elements.

3. The device according to claim 1, wherein one of the first and second handling units is a labelling device for the containers.

4. The device according to claim 1, wherein the control device is configured to cause every n-th container to be separated out, wherein n is the number of handling elements of the second handling unit.

5. The device according to claim 1, wherein the first handling unit and the second handling unit are synchronized with each other.

6. The device according to claim 1, wherein the second handling unit is a filling device for the containers.

7. The device according to claim 1, wherein the first handling unit is a heating device for pre-fowls or a blow-moulding device for containers.

8. The device according to claim 1, wherein the device further comprises a buffering unit for separated containers.

9. The device according to claim 1, wherein the plurality of handling elements of the second handling unit comprises a plurality of second handling elements, and wherein the first handling unit comprises a plurality of first handling elements for handling the containers.

10. The device according to claim 1 wherein the barring device further temporarily interrupts the supply of the plurality of containers assigned to the at least one of the plurality of handling elements of the second handling unit recognized as being in an atypical state or temporarily interrupting a supply of the plurality of containers recognized as being in an atypical state.

11. The device according to claim 10, wherein the supply of the plurality of containers recognized as being in the atypical state to be handled by the handling elements of the second handling unit is separated out.

12. The device according to claim 10, wherein the supply of the plurality of containers assigned to the at least one of the plurality of handling elements of the second handling unit is separated out.

13. The device according to claim 10, wherein the containers to be separated out are separated out after a heating procedure for the containers.

14. The device according to claim 10, wherein the containers to be separated out are arranged in a buffering device.

15. The device according to claim 1, wherein the barring device is arranged upstream with respect to the first handling unit.

16. The device according to claim 1, wherein the first handling unit is a heating unit.

17. The device according to claim 1, wherein the first and second handling units are blocked.

18. The device according to claim 1, wherein a clocked-time wheel is arranged downstream with respect to the first handling unit, and wherein the containers are transported separately after the clocked-time wheel.

19. The device according to claim 18, wherein the separating device is directly on or at the clocked-time wheel.

* * * * *